Figure 1:
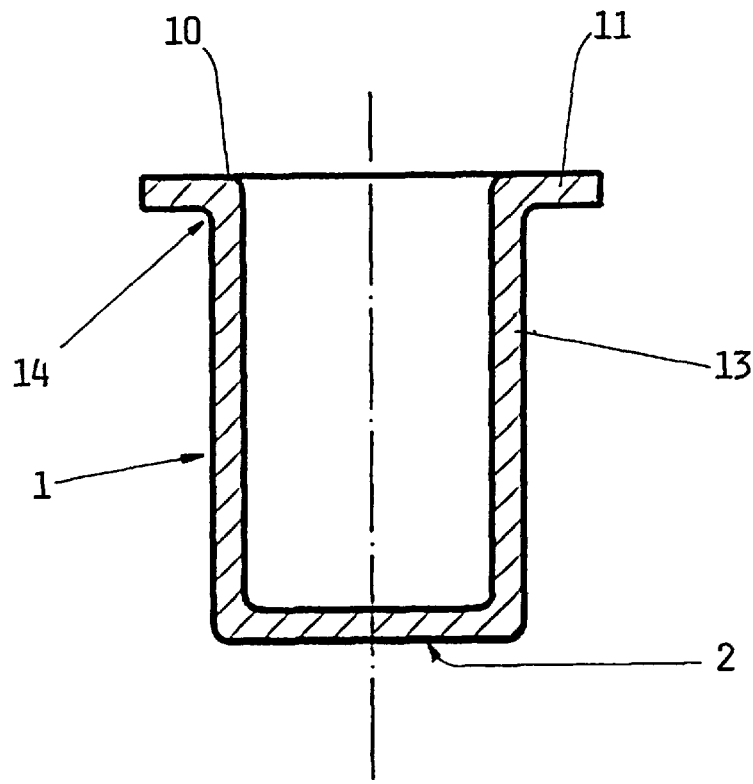

United States Patent [19]
Schneider

[11] Patent Number: 6,044,536
[45] Date of Patent: *Apr. 4, 2000

[54] METHOD FOR MAKING AN ASSEMBLY UNIT

[75] Inventor: Wilhelm Schneider, Rednitzhembach, Germany

[73] Assignee: Richard Bergner GmbH & Co., Schwabach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,281

[22] Filed: Dec. 20, 1996

[30] Foreign Application Priority Data

Dec. 23, 1995 [DE] Germany ............ 195 48 775

[51] Int. Cl.[7] ........................................... B23P 11/00
[52] U.S. Cl. .......................... 29/437; 29/511; 29/517; 411/353; 411/533; 403/279
[58] Field of Search ............... 29/510, 511, 517, 29/437; 411/352, 353, 533, 368, 369; 403/279

[56] References Cited

U.S. PATENT DOCUMENTS

| | | |
|---|---|---|
| 2,396,661 | 3/1946 | Keller et al. . |
| 3,395,441 | 8/1968 | Herbenar ............... 29/511 X |
| 3,395,442 | 8/1968 | Herbenar ............... 29/511 X |
| 3,421,562 | 1/1969 | Orloff et al. ............ 29/517 X |
| 4,732,519 | 3/1988 | Wagner ................. 411/533 X |
| 4,975,008 | 12/1990 | Wagner ................. 411/533 X |
| 5,244,325 | 9/1993 | Knohl ..................... 411/353 |
| 5,662,444 | 9/1997 | Schmidt, Jr. ........... 411/353 X |

FOREIGN PATENT DOCUMENTS

| | | |
|---|---|---|
| 0 042 170 B1 | 12/1981 | European Pat. Off. . |
| 0 272 642 | 6/1988 | European Pat. Off. . |
| 0 272 642 B1 | 6/1988 | European Pat. Off. . |
| 0 389 783 A1 | 3/1990 | European Pat. Off. . |
| 1 812 906 | 8/1958 | Germany . |
| 43 32 494 | 3/1994 | Germany . |
| 4-91840 | 3/1992 | Japan . |
| 95/21335 | 8/1995 | WIPO . |

*Primary Examiner*—Joseph M. Gorski
*Attorney, Agent, or Firm*—Venable; George H. Spencer; Catherine M. Voorhees

[57] ABSTRACT

In a method for making an assembly unit from an assembly bolt (3) that has a bolt head (9) and a shaft (6) and from a sleeve that has an axially movable annular collar (11) toward the head that surrounds a partial axial region of the shaft, first the shaft that has a counterpart back-engagement part is introduced into the sleeve, and then at least one back-engagement part on the sleeve is created by means of a stamping oriented essentially inward from the outer jacket face. The stamping has an action that is oriented radially inward and an action oriented toward the bolt head (9). In the stamping, a counterholder presses against the bearing face (22) of the annular collar (11) oriented toward the bolt head (9).

4 Claims, 5 Drawing Sheets

METHOD FOR MAKING AN ASSEMBLY UNIT

The invention relates to a method for making an assembly unit, which substantially comprises a sleeve and an assembly bolt that has a bolt head and a shaft. The assembly bolt in such assembly units is inserted into the sleeve; the sleeve is axially movable, and the axial mobility in the direction toward the headless end of the assembly bolt is limited by means of back-engagement parts, cooperating with one another to form a captive retainer, on the inside jacket face of the sleeve and on the circumference of the bolt. Although the term assembly bolt (also referred to as bolt) is used in a very general sense here, as a rule the term is understood to mean a screw.

When such an assembly unit is made, the procedure, in accordance with Japanese Patent Disclosure JP 4-91840, is such that the assembly bolt, which has a back-engagement part, is inserted into a sleeve that has an annular collar toward the head, and then a constriction is stamped near the annular collar, from the outer circumferential face of the sleeve, by means of an indenting rolling process. In this way, an annular protrusion that protrudes in the radial direction and cooperates with the back-engagement part of the assembly bolt in the manner of a captive retainer is created on the inside jacket face of the sleeve. The indenting rolling or stamping direction is transverse (radial) to the longitudinal sleeve axis.

The object of the invention is to improve a method of the type described such that a maximum of radial undercutting or connection security between the assembly bolt and the sleeve is created with the least possible positive displacement of material in the stamping process, and the greatest possible axial displace ability of the assembly bolt is made possible.

This object and others to become apparent as the specification progresses, are accomplished by the invention, according to which, briefly stated, the method of making an assembly unit composed of a bolt and a sleeve longitudinally slidable on the bolt and held captive by a first retainer part on the bolt in cooperation with a second retainer part on the sleeve, includes the following steps: providing a bolt, having a bolt axis, a bolt head, a shaft and a first retainer part formed on the shaft at an axial distance from the bolt head; and providing a sleeve having first and second opposite open ends and carrying a radially outwardly extending collar formed thereon at the first open end. The collar has an underside constituting a bearing face, and the sleeve has an angled transitional part where the collar joins the sleeve. The bolt is inserted into the sleeve such that the first retainer part of the bolt is situated inside the sleeve; and the second retainer part which extends substantially radially inwardly, is formed on the sleeve substantially in a radial alignment with the collar. Such forming step includes the steps of stamping the sleeve with a stamping tool at the transitional part in a stamping direction oriented towards the bolt head and having axial and radial components; and, during the stamping step, countersupporting the sleeve at the bearing face of the collar.

Aside from the advantage of a greater axial mobility of the assembly bolt if the back-engagement parts are created as close as possible to the annular collar of the sleeve, it is advantageous in the production mode of the invention that there is a greater accumulation of material overall in the region of the transition angle between the sleeve jacket and the annular collar than is the case if a stamping were done in the region of the jacket of the sleeve, so that a positive displacement of material with an overall lesser weakening of the thickness of the sleeve jacket can be accomplished. Some of the material radially displaced inward in the stamping operation originates in fact in the annular collar.

Making the back-engagement parts in the region of the transition angle has the further advantage that the back-engagement parts are positioned in a region that is encompassed by the annular collar. As a result, elastic radial spring deflection outward is practically impossible, and high dimensional stability is assured. The stabilizing effect of the annular collar makes itself felt in a positive way in the stamping itself as well. Warping of the sleeve and consequent departure from the intended cross-sectional shape is practically precluded.

In the conventional kind of method, the material of the sleeve is displaced radially inward without the aid of a counterholder. It is then unavoidable that some of the material will also be displaced in ineffective directions, such as in the axial or the circumferential direction. This material is then missing in the back-engagement part created in the inside jacket face of the sleeve. However, if as proposed according to the invention the head of the assembly bolt is used as a counterholder for the deformation, and at the same time the proposed stamping direction is adhered to, then the aforementioned proportion of ineffectively displaced material is less, and the displacement of material takes place primarily in the region of the annular collar or in its operative plane. Because the stamping direction extends obliquely in the direction of the annular collar or the bolt head, the radial exertion of force on the sleeve is reduced, which lessens the danger of deformation of the sleeve. The proposed stamping direction also has the effect that the material is shifted onto the counterholder and then directed radially inward. It has been found that in this way the "efficiency" of the stamping can be improved, in that in fact the ratio between the positively displaced volume of material and the radial length of the protrusion created is optimized. In the stamping according to the invention, material is accordingly predominantly displaced in the radial direction, so that the back-engagement parts created, which are lug like protrusions or the like, enable an optimal narrowing of the inside cross section of the sleeve and hence make large undercuts possible.

For instance, the counterholder may be a separate tool that for instance can be divided parallel to the longitudinal axis of the sleeve, or a tool that is open on one end in the manner of a horseshoe, which in the stamping operation is disposed between the annular collar and the bolt head and is acted upon directly or indirectly in the axial direction by a counterholding force. In an advantageous feature of the method of the invention, the counterholder is formed by the bolt head itself, which in the stamping operation rests with its underside on the bearing face of the annular collar, and is acted upon by a counterholding force.

Preferably, the stamping direction is selected such that it and the bolt axis form an acute angle of approximately 30° to 60°. A stamping is preferred in which radially inward-protruding back-engagement parts, for instance in the form of fixing lugs, are created at a plurality of points that are preferably spaced apart evenly in the circumferential direction. However, the back-engagement part may also be an uninterrupted annular protrusion, which is created by a stamping performed in the manner of a rolled-in indentation.

Figure 2:
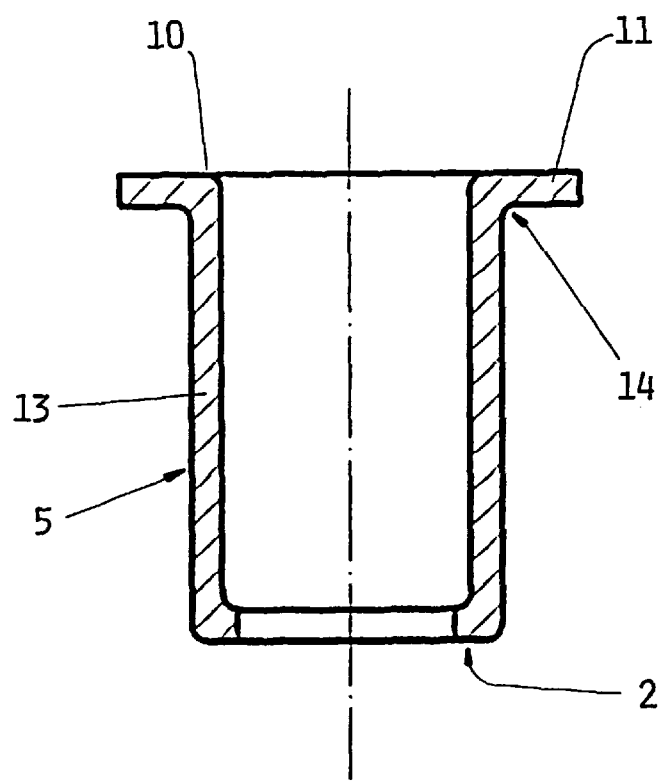
Figure 3:
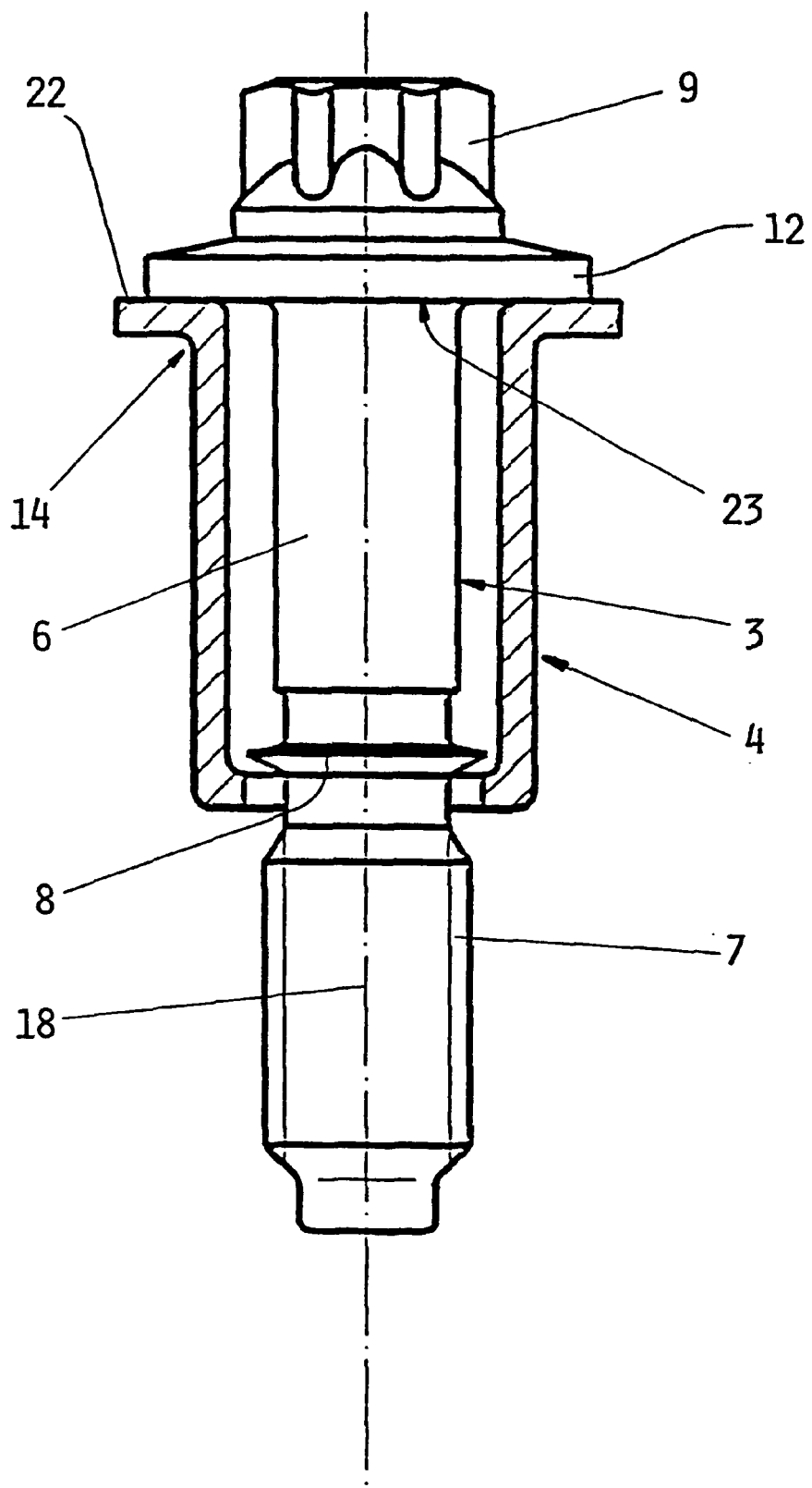
Figure 4:
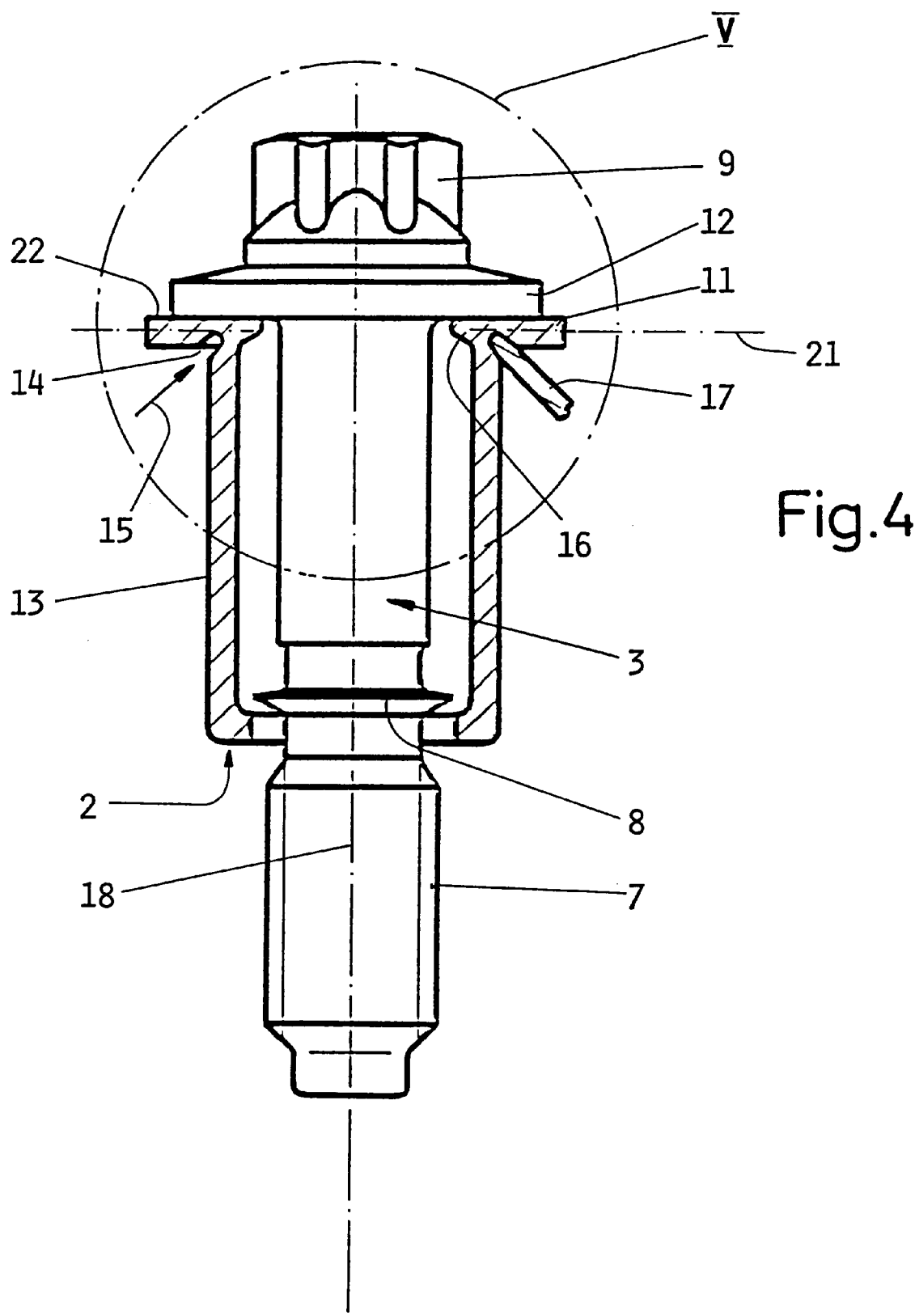
Figure 5:
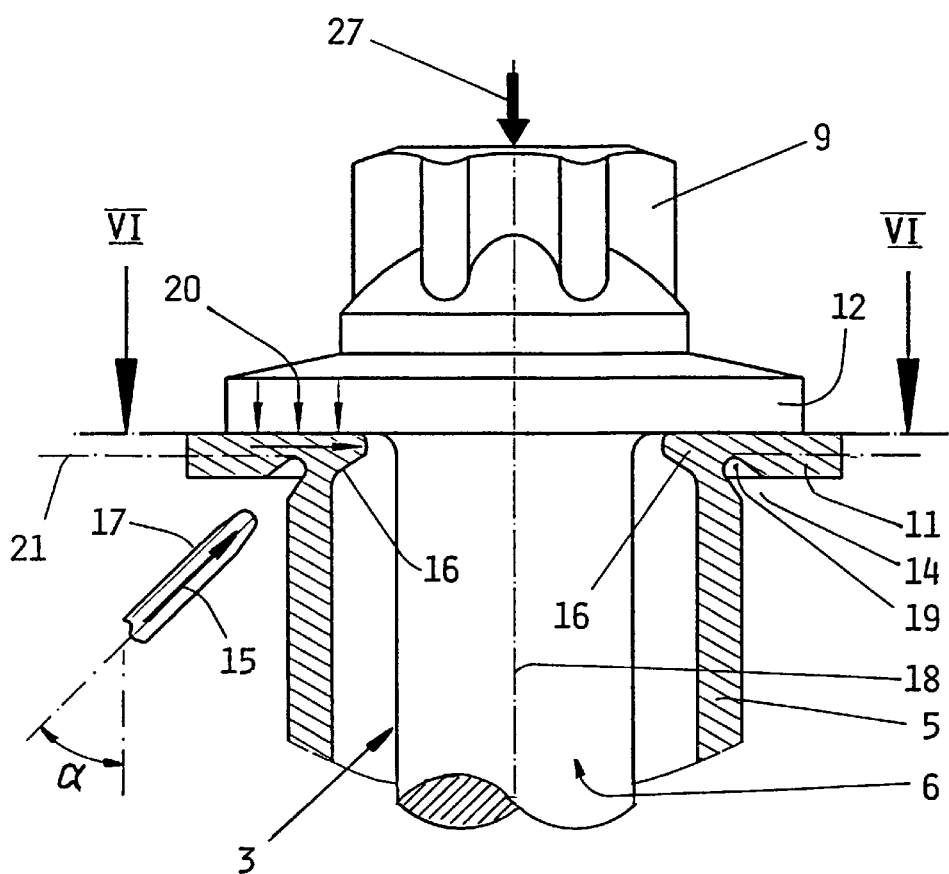
Figure 6:
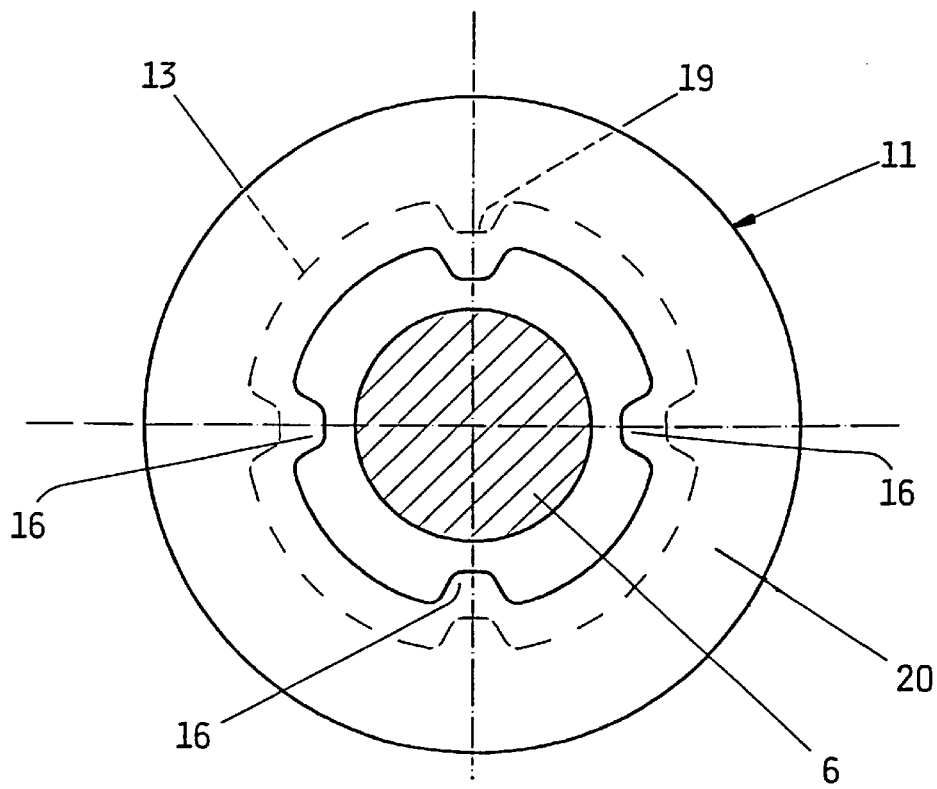
Figure 7:
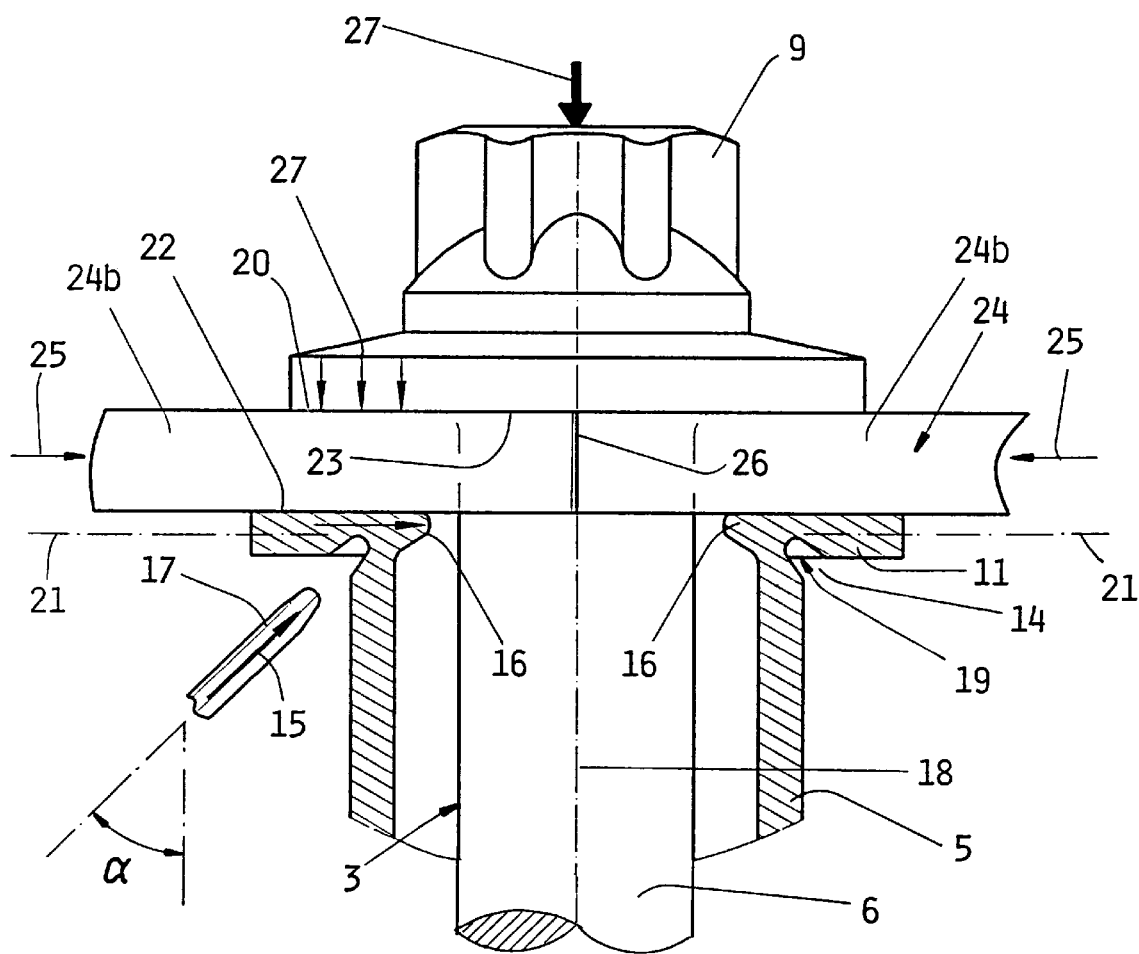

The production method according to the invention will now be explained in further detail in conjunction with the drawings, which show the individual steps of the method. Shown are:

FIG. 1, the sleeve blank of an assembly unit;

FIG. 2, a sleeve in the state ready for mounting;

FIG. 3, an assembly bolt inserted into a sleeve;

FIG. 4, an assembly unit once the indentation of a back-engagement part into the sleeve has been made;

FIG. 5, an enlarged view of the top region V of FIG. 4;

FIG. 6, a view of this same region seen in the direction of the arrow VI in FIG. 5;

FIG. 7, a view corresponding to FIG. 6, but in which a separate tool is used as the counterholder.

The procedure in making the assembly unit (FIG. 1 through FIG. 4) is performed in the following steps:

From a metal sheet (not shown), a cup-shaped member 1 (FIG. 1) is first made, for instance by deep drawing. The deep-drawn bottom of the member 1 is stamped out to make the lower end 2 of the sleeve 5 (FIG. 2). The sleeve may also be made by deformation of a solid block or by some other method.

The assembly bolt 3 is then inserted into the finished sleeve to make the complete assembly unit 4. The assembly bolt 3 is prefabricated in a conventional way. Between its shaft 6 and its thread 7, it has an annular bead 8 as a captive retainer; the operative diameter of the bead is greater than that of the thread 7 and shaft 6. The annular bead 8 is the captive retainer or counterpart back-engagement part assigned to the bolt 3; it cooperates with the other back-engagement part, described in further detail hereinafter, on the sleeve 5 in such a way as to prevent loss. It is also conceivable for the counterpart back-engagement part of the assembly bolt to be formed by the thread protruding past the bolt diameter thereof.

The sleeve 5, on its head end 10 toward the bolt head 9 and acting as an insertion funnel, has an annular collar 11 protruding radially outward. With this annular collar, in the final mounted state, the assembly unit rests on the assembly part, such as a cylinder head hood, in the circumferential region of a through slot (not shown) positioned there. The annular collar 11 also serves as a support for the bolt head 9 or a head flange 12 integral with the bolt head. To that end, the annular collar has a bearing face 22, which cooperates with the underside 23 of the head or of the head flange. The bolt head 9 can be shaped in any arbitrary way. Typically, its shaping serves the purpose of engagement by a tightening torque.

The sleeve 5, with its sleeve jacket 13, surrounds the bolt shaft 6 with great radial play. This play is so great that the assembly bolt 3 with its annular bead 8 can easily be inserted into the sleeve 5, with adequate play.

FIG. 3 shows the final position of the bolt 3 after its insertion into the sleeve 5. In this position, the bolt head 9 with its underside 23 rests on the bearing face 22 of the annular collar 11 and thus forms a counterholder for the stamping or deforming operation, described below, for making the counterpart element of the captive retainer on the sleeve 5. To that end, the transition angle 14 between the sleeve jacket 13 and the annular collar 11 is deformed spotwise radially inward toward the bolt head 9 from outside, approximately in the direction of the directional arrow 15. The deformation takes place for instance at four circumferential regions, distributed evenly over the circumference of the sleeve jacket 13 or annular collar 11, in order to form fixing lugs 16. The shaping of the fixing lugs 16 is done by means of a stamping mandrel 17, of which only the mandrel tip is schematically sketched in FIGS. 4 and 5. The deformation direction—represented here by the directional arrow 15—and the bolt or sleeve axis 18 form an acute angle α whose size is approximately 30° to 60°. What is essential here is that the deformation for forming the fixing lugs 16 be performed into the encompassing region of the annular collar 11, so that the fixing lugs 16 are positioned in practically the same plane as the annular collar 11. The advantages of this positioning are explained in the introduction to this specification.

The back-engagement part of the sleeve can be made, in other embodiment of the method, by a rolled-in indentation, so that an uninterrupted radially inward-protruding annular flange or annular protrusion is created on the inside jacket face of the sleeve. The indenting rolling direction corresponds to the stamping direction 15.

The counterholder may also be formed by a separate tool 24, which can be divided for instance parallel to the bolt axis 18. The tool halves 24a, 24b, before the bolt head 9 rests on the annular collar 11, are moved to the shaft 6 in the direction of the arrows 25, so that corresponding recesses in the respective tool halves surround the shaft 6, and the tool halves 24a, 24b touch one another in a parting line region 26. The tool 24 is acted upon with a counterholding force 27 either indirectly via the bolt head 9 or directly.

The making of the assembly unit, beginning with making the well in a metal sheet to make the sleeve (FIG. 1), through the insertion of the finished assembly bolt (FIG. 3) to the final product (FIGS. 4–6) can expediently also be done in a stamping and bending press that has successive stations.

I claim:

1. A method of making an assembly unit, comprising the steps of:

providing a bolt having a bolt head, a shaft extending axially from the bolt head and defining a bolt axis, and a first retainer part extending radially from the shaft and spaced a first distance from the bolt axis;

providing a sleeve having a tubular wall with first and second ends, a collar extending radially outwardly from the first end and having a bearing surface, and a transitional part interconnecting the tubular wall with the collar;

providing a counterholder surface;

inserting said bolt into said sleeve such that, said tubular wall surrounds said first retainer part, and said planar surface is positioned axially between said bearing surface and said bolt head; and then applying an axial force against said counterholder surface in a direction toward said bearing surface while forcing a stamping tool against said transitional part at an angle of approximately 30 degrees to 60 degrees relative to said bolt axis in a direction towards said counterholder surface, thereby forcing said counterholder surface against said bearing surface and plastically deforming said transitional part in an axial direction toward said counterholder surface and a radial direction toward said bolt axis, whereby a protrusion is formed that extends radially from said tubular wall toward said shaft and is spaced from said bolt axis a second distance which is less than said first distance and has upper surface that is substantially coplanar with at least a portion of said bearing surface, such that said sleeve is slidable along said shaft away from said bolt head until the protrusion engages said first retainer part.

2. The method according to claim 1, wherein the step of forcing the stamping tool against said transitional part includes forcing said stamping tool against said transitional part at a plurality of circumferentially spaced locations, whereby a plurality of protrusions are formed that each extend radially from said tubular wall toward said shaft and is spaced from said bolt axis a second distance which is less than said first distance and has an upper surface that is substantially coplanar with at least a portion of said bearing surface, such that said sleeve is slidable along said shaft away from said bolt head until the plurality of protrusions engage said first retainer part.

3. The method according to claim 1, wherein the step of forcing the stamping tool against said transitional part includes forcing a roller against said transitional part and then rolling the roller circumferentially around said transitional part, whereby said protrusion formed is an uninterrupted annular protrusion.

4. The method according to claim 1, wherein said bolt head has a lower surface, and the step of providing a counterholder surface comprises providing said lower surface as the counterholder surface.

\* \* \* \* \*